Nov. 12, 1940.   W. A. RINGLER   2,220,912
MERCHANDISE PACKAGE
Filed Oct. 11, 1937   2 Sheets-Sheet 2
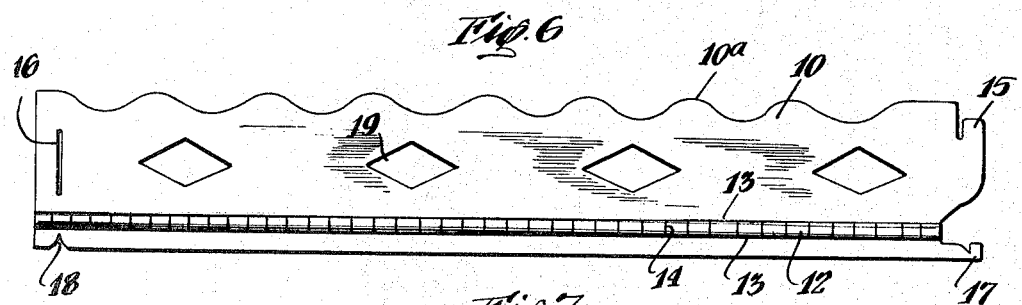
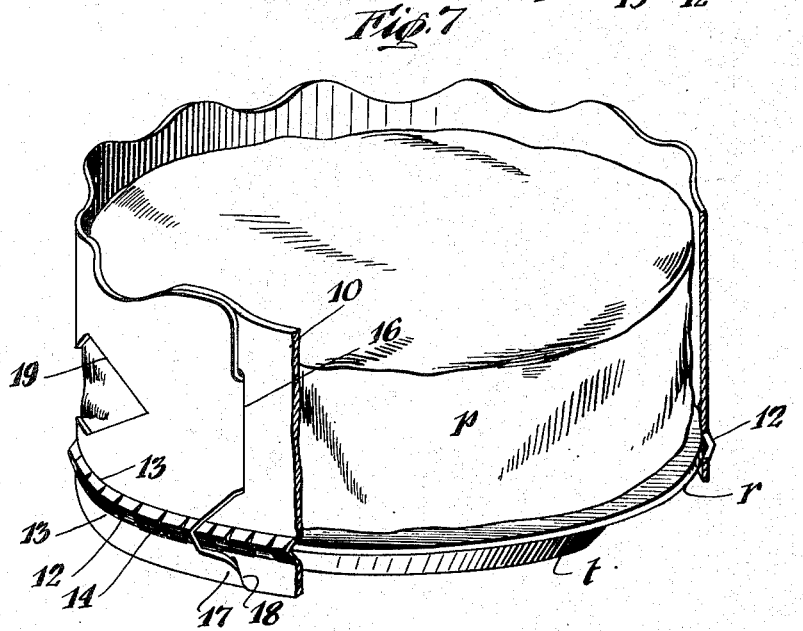
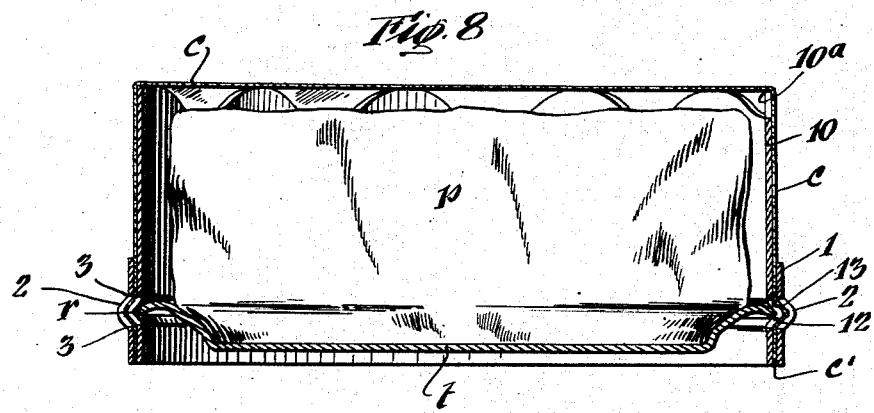
INVENTOR
*William A. Ringler*
BY
*Albert M. Austin*
ATTORNEY Patented Nov. 12, 1940

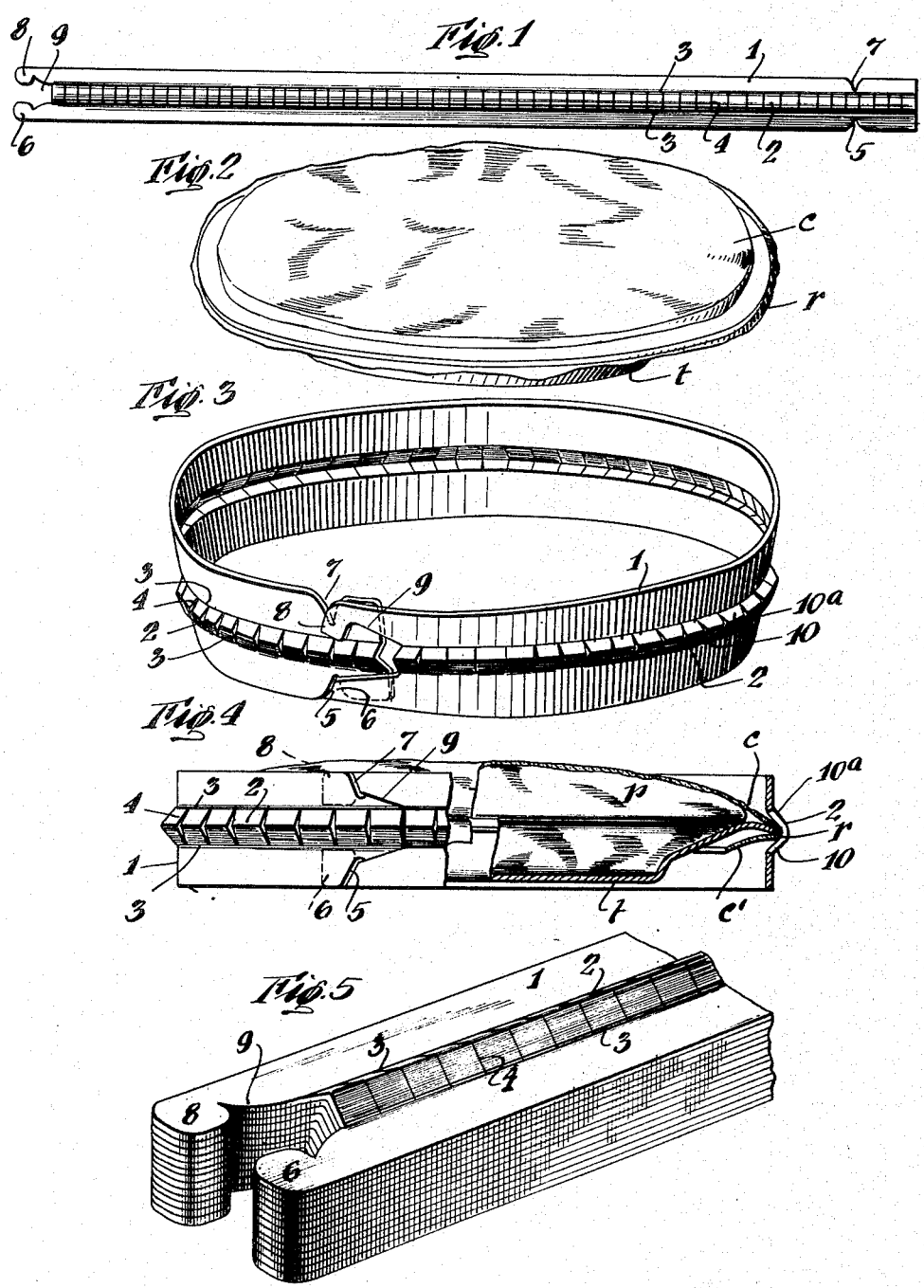

2,220,912

UNITED STATES PATENT OFFICE 2,220,912

MERCHANDISE PACKAGE

William A. Ringler, Wayne, Pa., assignor to National Folding Box Company, New Haven, Conn., a corporation of New Jersey Application October 11, 1937, Serial No. 168,367

9 Claims. (Cl. 206—44)

This invention relates to a merchandise package and more particularly relates to a package which is admirably adapted for the packaging of food and baked products.

In the merchandising of pies, cakes and the like edible products, it is important that the product be so packaged as to protect the contents from dust, dirt, flies and other foreign matter, and also to protect the product against the entry of moisture into the package and the escape of desirable moisture from the food product. It is also well known that edible food products, such as pies and cakes, are easily damaged by crushing. Substantial losses to bakeries and like food product manufacturing concerns occur, as the result of the deterioration or spoilage of the food product, for the reasons above stated.

An object of this invention is to provide a food package which is economical to manufacture and into which the food product may be conveniently and quickly assembled, and which offers full protection to the food product against contamination, dust, dirt, flies and vermin, which preserves the freshness and taste of the product, and which permits stacking of the packages one upon the other without danger of crushing.

Another object of this invention is the provision of an improved pie and cake package which can be manufactured at low cost and which satisfactorily meets the requirements of commercial bakeries and baked goods manufacturers.

Other objects of this invention will become apparent as the disclosure proceeds.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a plan view of a strip of paperboard suitably formed to provide the encircling band for my improved food or merchandise package;

Fig. 2 is a perspective view of an article of merchandise, such as a pie, positioned within a pie plate and enclosed in a wrapper ready to be inserted into the encircling band;

Fig. 3 is a perspective view of the encircling band shown in Fig. 1, shaped into hoop form and ready to receive the merchandise article and wrapper illustrated in Fig. 2;

Fig. 4 is a side elevational view of the fully assembled package, certain parts being broken away to illustrate certain features of the construction;

Fig. 5 is a fragmentary perspective view of a plurality of encircling bands arranged in superimposed stacked relationship to illustrate the compact manner in which the bands may be arranged for shipment or storage;

Fig. 6 is a plan view of a strip of paperboard suitably formed to provide a modified encircling band for a food package having a greater depth than the food package illustrated in Fig. 4;

Fig. 7 is a perspective view of the completed food package having incorporated therewith the band shown in Fig. 6, certain parts being broken away to more clearly illustrate the construction; and Fig. 8 is a transverse cross-sectional view through a food package of somewhat modified construction, incorporating therein both bands shown in Fig. 1 and Fig. 6;

Similar reference characters refer to similar parts throughout the several views of the drawings and the specification.

Referring to the drawings, there is shown in Fig. 4 a food package made in accordance with my invention, which comprises a band *l*, as illustrated in Figs. 1, 3 and 5, adapted to encircle plate or dish *t* covered by a suitable wrapper *c* within which the food product *p* is contained. The encircling band *l* may be formed from a strip of paperboard material cut from large rolls or sheets, the paperboard having substantial tensile and compression-resistant strength. A channel *2* is formed longitudinally in the band *l*, which channel may be formed by a suitable deforming roller which provides an outwardly extending bulge in the band, as illustrated in Figs. 3, 4 and 5. The outwardly extending bulged portion *2* is defined by spaced longitudinally extending score lines *3*, and the bulge or channel *2* is provided with a series of transversely extending cuts *4* which extend between the spaced score lines *3*. The channel *2* so formed provides a seat for the rim portion *r* of the food-supporting member *t*. Means are provided for connecting the ends of the band to provide a continuous hoop which surrounds the food-supporting member *t*, which means will be described more particularly hereinafter.

The food-supporting member *t* may comprise a dish-shaped member or relatively flat disc-shaped member preferably formed of relatively stiff paperboard or fiberboard material. The merchandise, such as a baked pie $p$, is positioned within the food-supporting member $t$ and a wrapper is placed over the merchandise $p$ with the peripheral edge $c'$ of the wrapper surrounding and extending around the rim or peripheral edge portion $r$ of the food-supporting member $t$.

In assembling the package, the wrapper is first applied to the merchandise or food article $p$ and the rim portion $r$ of the food-supporting member $t$ as above described. The wrapped article-supporting member $t$ is then telescoped into the surrounding band 1 which has previously been connected together at one edge thereof so as to provide a member of generally frusto-conical form, as illustrated in Fig. 3. It will be noted by referring more particularly to Figs. 1 to 5 that a cut-out 9 is provided at one end of the band, which defines and provides a lower hook portion 6 extending from the lower edge of the band and upper hook portion 8 extending from the upper edge of the band. A notch suitable to receive the hook portion 6 is cut out from the lower edge of the band near the opposite end thereof, which notch defines an abutment portion 5 with which the hook portion 6 engages. A notch suitable to reecive the hook portion 8 is cut out from the top edge of the band defining an abutment portion 7 with which the hook portion 8 may engage. The band may be assembled in frustro-conical form, as illustrated in Fig. 3, by hooking the hook portion 6 into engagement with the abutment portion 5 so as to connect the lower edge of the band in hoop form but leaving the upper edge of the band unconnected. The upper edge of the band can thus be expanded to facilitate the insertion of the wrapper-covered merchandise and merchandise-supporting member $t$, which can be dropped through the unconnected end of the frustro-conically arranged band. The rim portion $r$ of the supporting member $t$ will then drop into the channel-shaped groove 2 formed in the band member 1 whereby the member $t$ is supported in suspended position within the band. The hook portion 8 can then be hooked into engagement with the abutment portion 7 so as to connect the upper edge of the band and securely lock the supporting member $t$ and the wrapped articles supported thereon against movement within the band. It will be understood that the hook 8 of the band may first be hooked into engagement with the abutment portion 7 and the unconnected bottom edge of the blank then telescoped downwardly over the wrapped merchandise-supporting member $t$, thus obviating any possible disarrangement of the wrapper $c$. When the rim portion $r$ of the supporting member is properly seated in the groove 2, the bottom end of the band can then be connected by placing the hook 6 into hooking engagement with the abutment portion 5. Either assembly operation can be quickly and easily performed. The assembled band 1 provides a sturdy supporting wall which permits a plurality of packages to be vertically stacked one upon the other without danger that the delicate merchandise or food article contained therein will be crushed or otherwise damaged.

It will be noted that by providing the transverse cuts 4 in the groove or channel portion 2 of the band 1, the band may be completely formed in the flat. The band 1 will naturally assume a substantially circular contour when the band is shaped into hoop form and the ends thereof connected together. This hoop-forming operation also causes the segments of the channel 2 defined by the transverse cuts 4 to bulge outwardly. It will be evident to those skilled in the art that if the transverse cuts 4 were not provided in the groove 2 when formed in the flat strip, the groove then would iron or flatten out when the band was shaped into hoop form. With the groove in the encircling band formed as above indicated, however, overhanging seats 10 and 10a for the rim portion $r$ of the supporting member $t$ are provided, so that the member $t$ is securely and fixedly supported in suspended position within the encircling band. The cuts 4 further provide slight irregularities which frictionally prevent movement of the supporting member $t$ suspended within the band.

A merchandsise package particularly adapted to contain baked goods, such as cakes $p$, is shown in Fig. 7, the cake $p$ being supported upon a supporting member or dish $t$, the supporting member being held in suspended position by an encircling band 10 formed as shown in Fig. 6. The band 10 may be provided with an outwardly bulged channel or groove 12 extending longitudinally thereof and encircling the band when arranged in hoop form. The bulge 12 is conveniently spaced from the lower edge of the band body, but is preferably so spaced as to support the food-supporting member $t$ in suspended position within the band. The channel 12 is defined by parallel longitudinally extending score lines 13, transverse cuts 14 being provided extending through the channel 12 and between the spaced score lines 13.

In assembling the package, as shown in Fig. 7, the lower edge of the band 10 is connected together in hoop form by means of a hook portion 17 extending from one end and adjacent the lower edge thereof which is adapted to be hooked into engagement with an abutment portion 18 formed by a notch cut in the lower edge of the band adjacent the opposite end thereof. As thus connected, the band 10 will assume a generally frustro-conical hoop-shaped form. The merchandise $p$ supported upon a paperboard dish, disc, or other supporting member $t$ and enclosed within a surrounding wrapper $c$ which extends around the peripheral edge $r$ of the member $t$, may then be easily telescoped into the band through the expanded and unconnected upper end thereof. The rim portion $r$ will drop into seating position within the outwardly bulging groove 12, the wrapper $c$ being fixedly held in position by frictional engagement and the clamping pressure exerted on the peripheral edge $c'$ thereof. The upper edge portion of the band may then be connected together by inserting a hook portion 15 provided at one end of the band body into locking engagement with the material surrounding a suitable slot or aperture 16 provided in the other end of the band body, as illustrated more particularly in Fig. 7.

It will be noted in the package shown in Fig. 7 that the encircling band 10 has the upper edge thereof extending slightly above the top edge of the merchandise $p$, permitting these packages to be vertically stacked one upon the other without danger that the merchandise in the package might become crushed or damaged by reason of such stacking. The band 10 is made of relatively rigid, tough paperboard and will not become deformed by reason of the stacking pressure exerted thereon. To permit more complete inspection of the merchandise, suitable apertures 19 may be cut in the body of the band. The wrapper sheet c may comprise substantially impervious material, such as Cellophane, glassine paper, or wax paper and, when placed around the article p and the rim portion r of the supporting member t, provides an excellent seal which protects the product against contamination and also against the deleterious effect of moist or excessively dry atmospheres. In the packaging of certain products, however, the wrapper sheet c may be eliminated if desired.

If the food product p has considerable depth so as to require a band 10 of substantial width, the band 10 may be reenforced by applying a surrounding band 1 of the type shown in Fig. 1, which band may be applied to the exterior of the containing band 10, as illustrated in Fig. 8. The construction shown in Fig. 8 is also adapted to the packaging of very delicate cakes and products which might be damaged by contact of the wrap sheet c with the product p packaged therein. In this form the wrap sheet c may be positioned horizontally over the top edge 10a of the band 10 and extended over the exterior surface of the band 10 with the edge portion c' wrapped around the outwardly bulged channel portion 12 thereof. The encircling band 1 when applied operates to clamp the peripheral edge c' of the wrap between the exterior face of the channel portion 12 and the interior face of the channel portion 2, so that the wrap is firmly held in fixed position. The band 1 is applied to the package shown in Fig. 8 after the product p and its supporting member t has been inserted within the band 10 and the wrapper c positioned around the band 10 and around the channel portion 12 thereof. The construction shown in Fig. 8 thus provides an excellent package for the most delicate and spongiest food products and it further provides a double band-reenforced structure which permits vertical stacking of food products without danger that the surrounding side walls of the package will become deformed by the compressive pressure. Both the bands shown in Figs. 1 and 6 may be formed on an automatic cutting and scoring machine at a high production rate from large sheets or rolls of suitable paperboard, and both the bands 1 and 10 are adapted to be stacked in the flat so as to occupy a minimum of space during shipment and storage.

The food packages herein described are inexpensive to manufacture. The surrounding band as illustrated in Figs. 1 and 6 may be formed from large sheets or rolls of paperboard material which can first be printed with suitable advertising. The printed sheets or rolls may then be fed into an automatic cutting and scoring machine to cut and form the bands illustrated entirely automatically and at a high production rate. The food product-supporting plates t, may be formed from circular plates or discs of paperboard material of sufficient strength to properly support the food product positioned thereon. These plates may be cut from large sheets of paperboard onto a cutting and scoring machine, entirely automatically and at a high production rate. The food dishes t may also comprise the usual paper board dishes sometimes known as paperboard pie plates, of well known form. The wrapper may comprise a sheet of wrapping material, such as Cellophane, waxed or glassine paper cut in a circular or other convenient shape. The surrounding bands may be shipped to the baked goods manufacture in collapsed or extended form. The food-supporting plates or dishes and the wrappers c may be shipped to the baked food manufacturer in stacked relationship, occupying a minimum storage and shipping space. The wrapper c may be quickly applied and wrapped around the food product p positioned upon a supporting plate or dish quickly and expeditiously. The ends of the band may then be connected in hoop form and telescoped over the wrapped plate or dish, the band being so constructed as to automatically interlock with the peripheral edge of the wrapping sheet and the food-supporting plate or dish. If desired, the band may first be encircled around the wrapped supporting plate or dish and the ends then connected together. In the forms shown in Figs. 1 to 8 inclusive, one edge of the band may first be connected together before telescoping the band over the wrapped plate or dish, and then the other edge of the band may be conveniently connected together so as to securely lock the encircling band in fixed position around the wrapped food-supporting dish or plate.

It is thus evident that the pie and cake packages herein described can be manufactured entirely automatically and at low cost, and can be shipped and stored in collapsed condition, at a minimum cost for shipping and storage. The food product may be packaged quickly and conveniently. The food package has an unusually attractive appearance and advertising and other printed material can be placed on the encircling band. My improved pie and cake packages herein described can furthermore be arranged in convenient stacked relationship without danger that the food product contained therein will become crushed or otherwise damaged, and the package itself is rigid and strong and will not collapse or become deformed by the weight of superimposed packages.

While certain novel features of the invention have been disclosed and are pointed out in the annexed claims, it will be understood that various omissions, substitutions and changes may be made by those skilled in the art without departing from the spirit of the invention.

What is claimed is:

1. A food package including, a food supporting member, a transparent wrapper extending over the upper face of said member and around the peripheral edge thereof, a band encircling said member, said band having an outwardly bulging groove encircling said band providing a seat for said member to support said member in suspended position within said band, interengaging portions at each end of the band but on one side of said groove for connecting the band into hoop form prior to insertion of said food-supporting member, and interengaging portions at each end of the band but on the opposite side of said groove for further connecting the ends of said band after insertion of said food-supporting member, said band having spaced cuts extending transversely across said groove, whereby said groove will collapse laterally to provide a rigid support for said food-supporting member when load pressure is applied thereto.

2. A food package including, a food supporting member, a wrapper extending over the upper face of said member and over the peripheral edge thereof, a band encircling said member, means interior of the band for supporting said member in suspended position within the band, interengaging portions formed integral with the band adjacent the lower edge and below the member-supporting means of the band for connecting the band into hoop form prior to the insertion of said food supporting member and wrapper therein, and interengaging portions formed integral with the band adjacent the upper edge and above the member-supporting means of the band for further connecting the ends of said band after insertion of said food supporting member and wrapper within said band whereby said food supporting member is locked in suspended position within said band.

3. A food package including, a food supporting member, a wrapper extending over the upper face of said member and around the peripheral edge thereof, a band encircling said member, said band having a groove formed therein providing a seat for the peripheral edge of said member and wrapper whereby to support said food supporting member in suspended position within said band, interengaging portions adjacent the ends of and adjacent one edge of and on one side of the groove in said band for connecting the band into hoop form prior to the insertion of said food supporting member therein, and interengaging portions adjacent the ends of and adjacent the other edge of and on the other side of the groove in said band for further connecting the ends of said band after insertion of said food supporting member therein, whereby said member is locked in suspended position within said band.

4. A food package including, a food supporting member, a transparent wrapper extending over the upper face of said member and surrounding the peripheral edge thereof, a band encircling said member, said band having an outwardly bulging groove extending circumferentially thereof providing a seat for the peripheral edge of said member and wrapper to support said member and wrapper in suspended position within said band, cooperating hook portions adjacent the lower edge of and below the groove in said band for partially connecting the ends of said band into hoop form prior to insertion of the food supporting member therein, and cooperating hook portions adjacent the upper edge of and above the groove in said band for further connecting the ends of said band after insertion of said food supporting member therein whereby to lock said food supporting member in suspended position within said band.

5. A food package including, a food-supporting plate, a band encircling said plate, said band having an outwardly bulged groove intermediate the upper and lower edges thereof which receives the peripheral edge of said plate and supports said plate in suspended position within said band, cooperating interengaging portions at each end of the band below said groove, and cooperating interengaging portions at each end of the band above said groove, said cooperating interengaging portions above and below said groove being separately attachable before and after insertion of said food-supporting plate into said band.

6. A food package including, a food-supporting plate, a band adapted to encircle said plate, said band having means adjacent the upper and lower edges thereof for supporting said plate in suspended position within said band, a hook element adjacent one end of the band and below said supporting means adapted to interlock with attaching means at the other end of the band below said supporting means to connect the lower edge of said band in hoop form, and a hook element at one end of the band above said supporting means adapted to interlock with attaching means at the other end of the band above said supporting means to connect the upper edge of said band in hoop form.

7. A food package including, a food-supporting dish having a laterally extending peripheral flange, a band encircling said dish, said band having a groove intermediate the upper and lower edges thereof providing a seat for the peripheral flange of said dish supporting said dish in suspended position within said band, a hook element adjacent one end of the band and below said dish-supporting groove adapted to interlock with attaching means at the other end of the band below said groove to connect the lower edge of said band in hoop form, and a hook element at one end of the band above said groove adapted to interlock with attaching means at the other end of the band above said groove to connect the upper edge of said band in hoop form.

8. A food package including, a food-supporting dish having a laterally extending peripheral flange, a band encircling said dish, said band having an outwardly bulged groove intermediate the upper and lower edges thereof providing a seat for the peripheral flange of the dish whereby said dish is supported in suspended position within said band, said groove having spaced cuts extending transversely across said groove to permit outward collapse of said groove when load pressure is applied to said food-supporting dish, interengaging portions at each end of the band below said groove, and interengaging portions at each end of the band above said groove, said interengaging portions above and below said groove being separately attachable before and after insertion of said food-supporting dish into said band.

9. A food package including, a food-supporting member, a band encircling said member having a groove intermediate the upper and lower edges thereof engaged by the peripheral edge of said member to support said member in suspended position in said band, a hook portion at one end of the band below said groove adapted to engage a slit portion at the other end of the band below said groove, and a hook portion at one end of the band above said groove adapted to engage a slit portion at the other end of the band above said groove, each of said hooks being separately attachable to its associated slit portion at the other end of the band.

WILLIAM A. RINGLER.